United States Patent Office.

VELENUS W. CROWSEN, OF WESTFIELD, MASSACHUSETTS, ASSIGNOR TO HIMSELF AND STEPHEN MASSEY, OF SAME PLACE.

Letters Patent No. 104,433, dated June 21, 1870.

---

IMPROVED METHOD OF COVERING WHIPS.

---

The Schedule referred to in these Letters Patent and making part of the same.

---

I, VELENUS W. CROWSEN, of Westfield, county of Hampden, Commonwealth of Massachusetts, have invented a new and useful Improved Covering for Whips, of which the following is a specification.

Nature and Object of the Invention.

My invention consists in the application of a covering of raw gutta-percha to whip-stocks, for the purpose of forming a flexible, durable, and water-proof protection for the stock.

General Description.

My invention consists, generally in the application of a coat of melted gutta-percha to the outside of a whip-stock formed of whale-bone, rattan, or other similar and suitable material, and the process of application is as follows:

The gutta-percha, in its hard state, is placed in a pan surrounded by water in an outside pan or kettle. The water is then brought to the boiling point, and the gutta-percha melts, and becomes liquid. A coat of the proper thickness is then applied, by means of a brush, to the whip-stock, and is hardened and combined together by rolling between two slabs of stone or other smooth surfaces.

In this manner the stock is completely enveloped by the gutta-percha, and thus thoroughly protected by a water-proof covering evenly and smoothly distributed over the entire surface of the whip, which is perfectly flexible, and has a good surface, upon which varnish may be applied, if desired, to produce a finer finish.

Claim.

I claim a whip-stock covered with raw gutta-percha, substantially in the manner described.

VELENUS W. CROWSEN.

Witnesses:
J. B. GARDINER,
H. B. STEVENS.